(12) United States Patent
Han et al.

(10) Patent No.: US 10,521,228 B2
(45) Date of Patent: *Dec. 31, 2019

(54) DATA READ-WRITE SCHEDULER AND RESERVATION STATION FOR VECTOR OPERATIONS

(71) Applicant: Cambricon Technologies Corporation Limited, Beijing (CN)

(72) Inventors: Dong Han, Beijing (CN); Shaoli Liu, Beijing (CN); Yunji Chen, Beijing (CN); Tianshi Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,603

(22) Filed: Nov. 7, 2018

(65) Prior Publication Data

US 2019/0073220 A1    Mar. 7, 2019

Related U.S. Application Data

(60) Division of application No. 16/039,605, filed on Jul. 19, 2018, now Pat. No. 10,223,115, which is a (Continued)

(30) Foreign Application Priority Data

Jan. 20, 2016  (CN) .......................... 2016 1 0038178

(51) Int. Cl.
*G06F 9/34*      (2018.01)
*G06F 9/312*     (2018.01)
(Continued)

(52) U.S. Cl.
CPC .......... *G06F 9/30036* (2013.01); *G06F 15/76* (2013.01); *G06F 15/78* (2013.01);
(Continued)

(58) Field of Classification Search
CPC ............ G06F 9/30036; G06F 9/30043; G06F 9/3836; G06F 9/3838; G06F 9/3824;
(Continued)

(56) References Cited

U.S. PATENT DOCUMENTS 4,760,545 A  *  7/1988  Inagami .............. G06F 15/8084
                                                     708/520
5,701,488 A  *  12/1997  Mulchandani ...... G06F 11/3664
                                                     714/31

(Continued)

*Primary Examiner* — Daniel H Pan
(74) *Attorney, Agent, or Firm* — Getech Law LLC; Jun Ye

(57) ABSTRACT

The present disclosure provides a data read-write scheduler and a reservation station for vector operations. The data read-write scheduler suspends the instruction execution by providing a read instruction cache module and a write instruction cache module and detecting conflict instructions based on the two modules. After the time is satisfied, instructions are re-executed, thereby solving the read-after-write conflict and the write-after-read conflict between instructions and guaranteeing that correct data are provided to a vector operations component. Therefore, the subject disclosure has more values for promotion and application.

16 Claims, 7 Drawing Sheets

Related U.S. Application Data continuation-in-part of application No. PCT/CN2016/078576, filed on Apr. 6, 2016.

(51) Int. Cl.
  *G06F 15/76* (2006.01)
  *G06F 9/30* (2018.01)
  *G06F 15/78* (2006.01)
  *G06F 15/80* (2006.01)
  *G06F 9/38* (2018.01)

(52) U.S. Cl.
  CPC ...... *G06F 15/7842* (2013.01); *G06F 15/8053* (2013.01); *G06F 9/30043* (2013.01); *G06F 9/3824* (2013.01); *G06F 9/3826* (2013.01); *G06F 9/3836* (2013.01); *G06F 9/3838* (2013.01); *G06F 15/7846* (2013.01)

(58) Field of Classification Search
  CPC ...... G06F 9/3826; G06F 15/78; G06F 9/7842; G06F 9/8053; G06F 9/7846
  USPC ......... 712/2, 7, 8, 9, 216–219; 711/104, 105
  See application file for complete search history.

(56) References Cited

U.S. PATENT DOCUMENTS

| | | | |
|---|---|---|---|
| 6,594,748 B1 * | 7/2003 | Lin | G06F 13/1689 711/151 |
| 7,526,629 B2 * | 4/2009 | Saida | G06F 9/383 712/2 |
| 8,924,898 B2 * | 12/2014 | Killian | G06F 17/5045 712/1 |
| 2003/0149841 A1 * | 8/2003 | Middleton | G06F 12/0851 711/128 |
| 2019/0073221 A1 * | 3/2019 | Han | G06F 15/78 |

\* cited by examiner

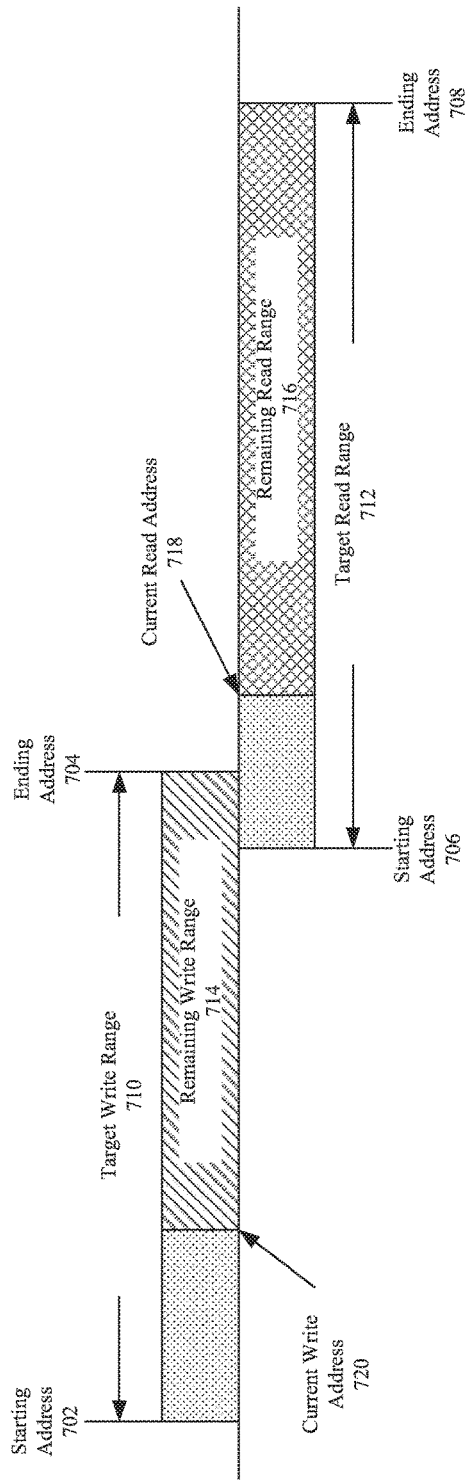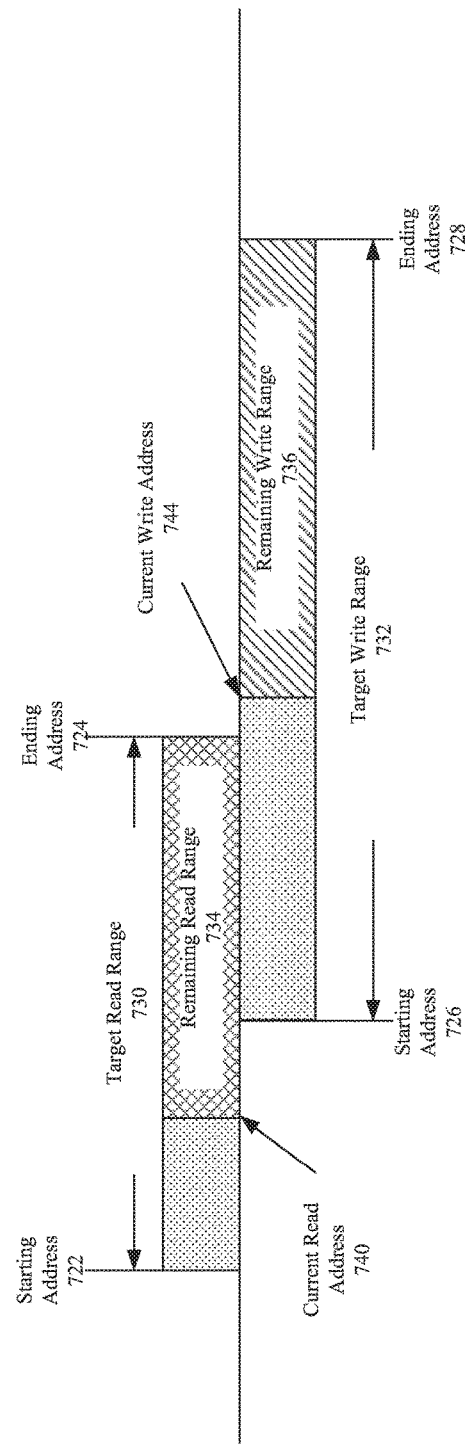
Fig. 7A
Fig. 7B

DATA READ-WRITE SCHEDULER AND RESERVATION STATION FOR VECTOR OPERATIONS

CROSS-REFERENCE TO RELATED APPLICATIONS

This Application is a divisional of U.S. patent application Ser. No. 16/039,605, filed on Jul. 19, 2018, entitled "Data Read-Write Scheduler and Reservation Station for Vector Operations," which is a continuation-in-part of PCT/CN2016/078576, filed on Apr. 6, 2016, which claims the benefit of priority to CN Patent Application No. 201610038178.4, filed on Jan. 20, 2016. The entire content of each of the aforementioned patent applications is incorporated herein by reference.

TECHNICAL FIELD

The subject disclosure relates to the technical field of computers, and in particular, relates to a data read-write scheduler in a reservation station for vector operations.

BACKGROUND

Vector operations, including matrix operations, are performed in the fields such as machine learning, pattern recognition, image processing, and graph computation. For example, deep learning algorithms developed in the past years enjoy high recognition accuracy and better parallelizability.

On the one hand, after a vector read instruction, there may be a vector write instruction which has an overlapping relationship with the address accessed by the vector read instruction, i.e. the write-after-read conflict; on the other hand, after a vector write instruction, there may be a vector read instruction which has an overlapping relationship with the address accessed by the vector write instruction, i.e. the read-after-write conflict.

Conventional graphics processors can support various complex vector operations by the execution of general-purpose SIMD (Single Instruction Multiple Data) instructions with a general-purpose register file and a general-purpose stream processing unit. However, conventional graphics processors mainly execute graphics and image operations, cache the read data through a great number of additional registers, and perform reading and execute computations in parallel through a great number of computing components. Therefore, RAM (Random Access Memory) is preferred for supporting a plurality of read-write channels but the size of the on-chip RAM is limited. Meanwhile, when there are a limited number of computing components and it requires a great amount of data operations, there are still a great number of instructions required, and thus the overhead for front-end encoding is increased.

General-purpose processors use SISD (Single Instruction Single Data stream) instructions for complex vector operations. In this way, a great number of instructions are required for processing vector operations, and similarly, when the read-after-write conflicts and write-after-read conflicts are being processed, more register groups are required for recording relevant information, thereby greatly increasing the overhead for vector operations.

SUMMARY

Technical Problems to be Solved

In view of the above technical problems, the subject disclosure provides a data read-write scheduler and a reservation station for vector operations, so as to overcome the read-after-write conflict and the write-after-read conflict in the existing vector operations.

Technical Solution

According to one aspect of the subject disclosure, the subject disclosure provides a data read scheduler 394 for vector operations. The data read scheduler 394 comprises an instruction cache 310 for caching a vector read instruction; a read instruction preprocessing module 320 comprising at least a read instruction preprocessing unit, the read instruction preprocessing unit receiving a vector read instruction output by the instruction cache 310, and detecting whether there is a write-after-read conflict between the vector read instruction and the vector write instruction stored in a write instruction cache module 350, if yes, the vector write instruction having a write-after-read conflict serving as a vector write instruction that the vector read instruction depends on; a read instruction cache module 340, comprising at least a read instruction cache unit, the read instruction cache unit being used for receiving and caching vector read instructions and vector write instructions that the vector read instructions depend on, and dynamically updating the status of the cached vector read instruction and launching a vector read instruction complying with the requirements according to the execution status of the vector read instruction obtained from a read control module and the execution status of the vector write instruction that a vector read instruction depends on and is obtained from the write control module; a read control module 360, comprising at least a read control unit, the read control unit receiving a vector read instruction launched by a read instruction cache unit, parsing therefrom a specific read request, determining the time for executing a read request according to the status of a vector write instruction that the vector read instruction depends on, and when the time is satisfied, sending the read request to an off-chip RAM, storing the input data received from the off-chip RAM in a read data cache module 380 for use by a vector operations component.

According to another aspect of the subject disclosure, the subject disclosure further provides a data write scheduler for vector operations. The data write scheduler comprises: an instruction cache 310 for caching a vector write instruction; a content data cache 390 for caching data written that need to be written into an on-chip RAM 200; a write instruction preprocessing unit 330 for receiving a vector write instruction input by the instruction cache 310, and detecting whether there is a read-after-write conflict between the vector write instruction and the vector read instruction stored in a read instruction cache module 340, if yes, the vector read instruction having a read-after-write conflict serving as a vector read instruction that the vector write instruction depends on; a write instruction cache module 350 for receiving vector write instructions processed by the write instruction preprocessing unit 330, and dynamically updating the status of the cached vector write instruction and launching a vector write instruction complying with the requirements according to the execution of the corresponding instructions of a read control module 360 and a write control module 370; and the write control module 370 for receiving the vector write instruction launched by the write instruction cache unit 350, and parsing therefrom a specific read request, and receiving data written from a content data cache 390, determining the time for executing a write request according to the status of a vector read instruction that the vector write instruction depends on and is obtained from the read control module 360, and when the time is satisfied, sending the write request and data written to the on-chip RAM 200, and then receiving the feedback of the write result from the on-chip RAM 200.

According to another aspect of the subject disclosure, the subject disclosure further provides a data read-write scheduler for vector operations. The data read-write scheduler comprises: the above data read scheduler and the above data write scheduler, wherein the data read scheduler and the data write scheduler share an instruction cache 310, a write instruction cache module 350, a read instruction cache module 340, a read control module 360 and a write control module 370.

According to further another aspect of the subject disclosure, the subject disclosure further provides a reservation station for vector operations. The reservation station comprises: an I/O interface 100, an on-chip RAM 200, a data read-write scheduler 300, a decoder 400 and a vector operations component 500, wherein the on-chip RAM 200 is used for storing the input data required for vector operations and output data obtained through computation; the I/O interface 100 is used for having read-write access to the on-chip RAM 200 outside a chip, including: loading the input data that need to be processed to the on-chip RAM 200, and then moving the output data computed after operations to the outside of the chip; the decoder 400 is used for reading instructions from an external instruction cache queue, and decoding the same to specific vector read instructions, vector write instructions and vector operations instructions, sending the vector read instructions and vector write instructions to the data read-write scheduler 300 for execution; sending the vector operations instructions to the vector operations component 500 for execution; the data read-write scheduler 300 is the described data read-write scheduler; the vector operations component 500 is used for receiving the input data from the data read-write scheduler for operations after receiving the vector operations instruction sent by the decoder, and then transmitting the output data obtained from operations to the data read-write scheduler 300 for write operation.

Beneficial Effects

It can be seen from the above technical solution that the data read-write scheduler and the reservation station for vector operations in the subject disclosure have the following beneficial effects:

(1) capable of processing the dependency relationship between vector read-write instructions, solving the read-after-write conflict and the write-after-read conflict between instructions and guaranteeing the correctness of data provided to the vector operations component;

(2) capable of increasing the speed of reading data and improving the utilization efficiency of an off-chip RAM by out-of-order execution of vector read instructions when guaranteeing that correct data are provided to the vector operations component;

(3) capable of efficiently and stably providing vector data for the vector operations component and quickly writing back vector results obtained through computation, thereby improving the utilization efficiency of the vector operations component.

BRIEF DESCRIPTION OF THE DRAWINGS

FIG. 7A and FIG. 7B are diagrams illustrating the relation between a target write range of a vector write instruction and a target read range of a vector read instruction.

DETAILED DESCRIPTION

The subject disclosure provides a read instruction cache module and a write instruction cache module and avoids the write-after-read conflict and the read-after-write conflict by the above two modules detecting conflict instructions.

The subject disclosure is further explained in detail below in accordance with the drawings.

Figure 1:
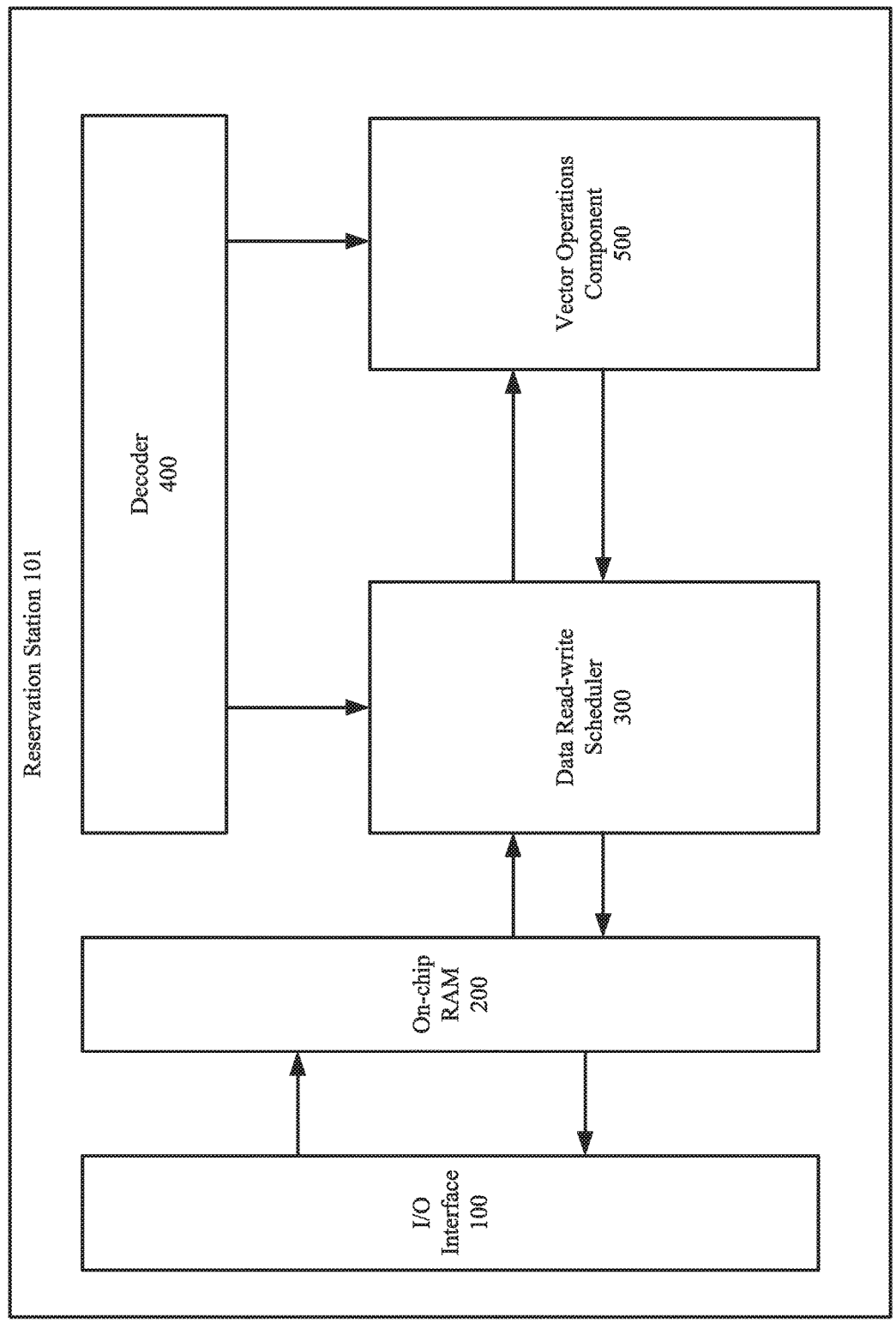
FIG. 1 is a structure diagram of the reservation station for vector operations according to the embodiments of the subject disclosure.

In an exemplary embodiment of the subject disclosure, a reservation station 101 for vector operations is provided. As shown in FIG. 1, the reservation station 101 for vector operations in the embodiment includes: an I/O interface 100, an on-chip ram 200, a data read-write scheduler 300, a decoder 400 and a vector operations component 500.

The I/O interface 100 may be used for managing read-write access to the on-chip RAM 200 from devices external to the reservation station 101, including: loading the input data that need to be processed to the on-chip RAM 200 After the data is processed and written back to the on-chip RAM 200, the I/O interface 100 may be configured to move the processed data to the outside of the chip via the I/O interface 100. The on-chip RAM 200 may be configured to store the input data required by vector operations and the processed data. The data read-write scheduler 300 may be configured to read the input data from the on-chip RAM 200, transmit the input data to the vector operations component 500 for computation, and then store the vector operations results, i.e., the output data, to the on-chip RAM 200 according to the vector read-write instructions provided by the decoder 400.

The decoder 400 may be configured to read instructions from an external instruction cache queue and decode the instructions to a plurality of specific vector read-write instructions (vector read instructions and vector write instructions), and vector operations instructions, send the vector read instructions and vector write instructions to the data read-write scheduler 300 and the vector operations component 500 for execution. The vector operations component 500 may be configured to receive the vector operations instructions from the decoder 400, receive the input data from the data read-write scheduler 300 for operations, and then transmit the processed data back to the data read-write scheduler 300 for vector write operations. Further, the vector operations component 500 may be configured to perform operations for vectors of different dimensions, e.g., 0-dimension, 1-dimension, 2-dimension . . . N-dimension. N may refer to an integral that is larger than 2. Thus, the vector operations instructions may include operations instructions corresponding to vectors of different dimensions. In other words, the vector operations component 500 may be configured to perform operations for vectors and multi-dimensional tensors. The data read-write scheduler 300 are described in greater detail below.

Figure 2:
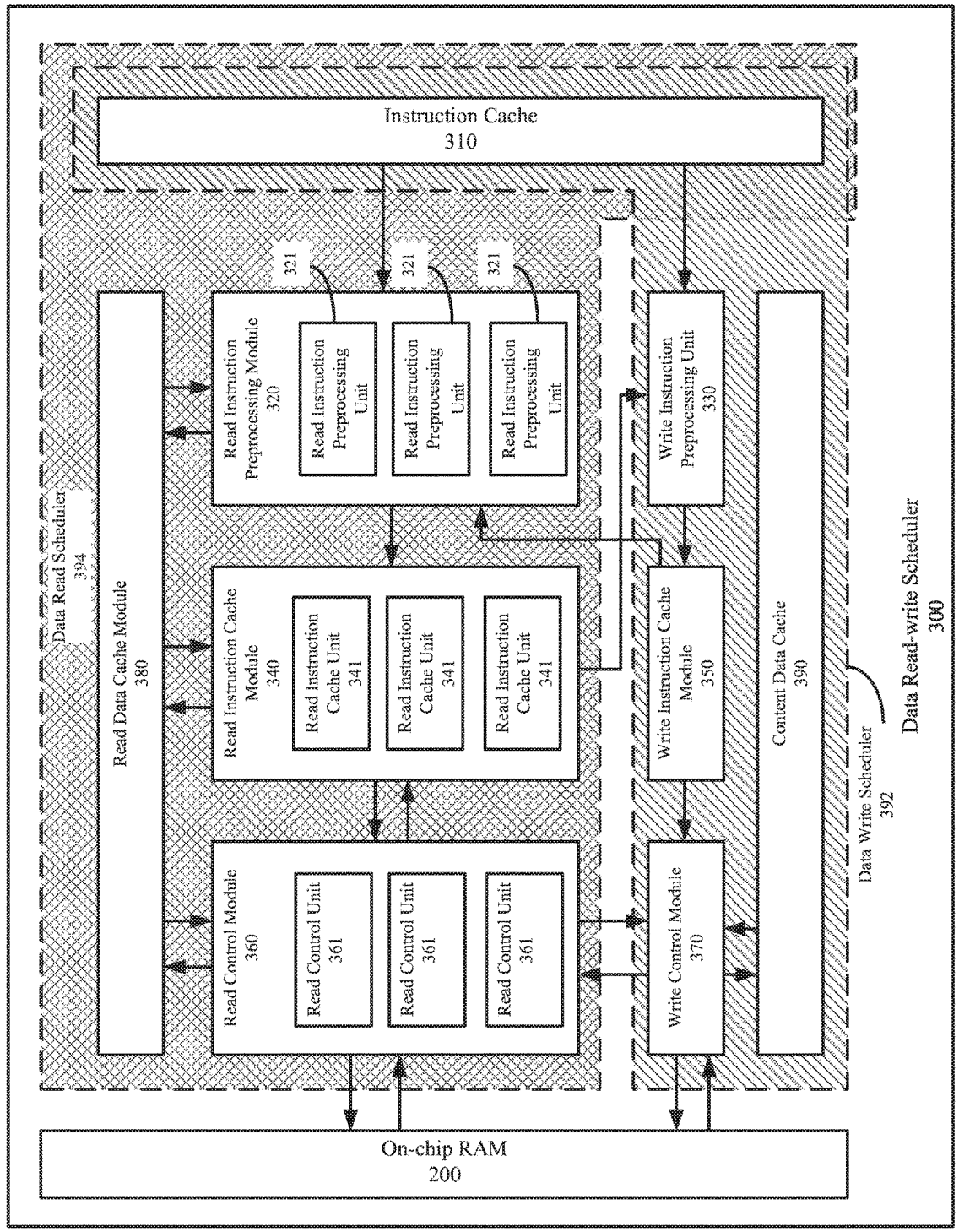
FIG. 2 is a structure diagram of the data read-write scheduler in the reservation station as shown in FIG. 1.

FIG. 2 is a structure diagram of the data read-write scheduler 300 in the reservation station as shown in FIG. 1. With reference to FIG. 2, the data read-write scheduler 300 includes a data read scheduler 394 and a data write scheduler 392. The data read scheduler 394 may include a read instruction preprocessing module 320 and a read control module 360. The data write scheduler 392 may include a write instruction preprocessing unit 330 and a write control module 370. The data read scheduler 394 may further include an instruction cache 310 that may be shared with the data write scheduler 392, a read instruction cache module 340, and a read data cache module 380. The data write scheduler 392 may include the instruction cache 310 configured to communicate with the decoder 400, a write instruction cache module 350, and a content data cache 390 configured to store content data to be written into the on-chip RAM 200. The data read scheduler 394 and the data write scheduler 392 are described in greater detail below.

As shown in FIG. 2, in at least one example, the instruction cache 310 may be shared by the data read scheduler 394 and the data write scheduler 392 such that the structure of the data read-write scheduler 300 may be simplified. The instruction cache 310 may be configured to receive vector read instructions and/or vector write instructions from the decoder 400 and to store the received vector read instructions and vector write instructions in an instruction queue.

In at least one example, the read instruction preprocessing module 320 includes one or more read instruction preprocessing units 321 corresponding to one or more vector read instructions. The read instruction preprocessing units 321 may be configured to receive vector read instructions from the instruction cache 310. The read instruction preprocessing units 321 may be further configured to analyze the read-after-write conflict between each vector read instruction and the one or more vector write instructions stored in the write instruction cache module 350. In more detail, each vector read instruction may include a pair of starting and ending addresses. The starting and ending addresses may identify an address range in the on-chip RAM 200 from which the vector read instruction is configured to retrieve data. The address range indicated in the vector read instruction may be referred to as a target read range. Further, each vector read instruction may include one or more read requests that may be sequentially executed and respectively configured to read data from an address in the on-chip RAM. The address may be referred to as a read address.

Similarly, each vector write instruction may include a pair of starting and ending addresses that identify an address range in the on-chip RAM 200 to which the vector write instruction is configured to write the content data. The address range indicated in the vector write instruction may be referred to as a target write range. Each vector write instruction may include one or more write requests that may be sequentially executed and respectively configured to write data to an address in the on-chip RAM. The address may be referred to as a write address.

By comparing the target read range to each of the one or more target write ranges, the read instruction preprocessing units 321 may be further configured to detect one or more write-after-read conflicts. In more detail, if the target read range indicated by the vector read instruction overlaps, at least partially, a target write range indicated by one of the vector write instructions, a write-after-read conflict exists with respect to the vector read instruction and one of the vector write instructions. The vector write instruction that results the write-after-read conflict may be referred to as an overlapping or conflicting vector write instruction. A nearest overlapping vector write instruction may then be selected as the vector write instruction that the vector read instruction depends on (interchangeably referred to as dependent vector write instruction), and the identification ("ID" hereinafter) of the vector write instruction, together with the vector read instruction, may be stored in the queue of the read instruction cache module. In other words, the nearest overlapping vector write instruction may refer to an overlapping vector write instruction stored nearest to the vector read instruction in an instruction queue in the instruction cache 310.

Figure 3:
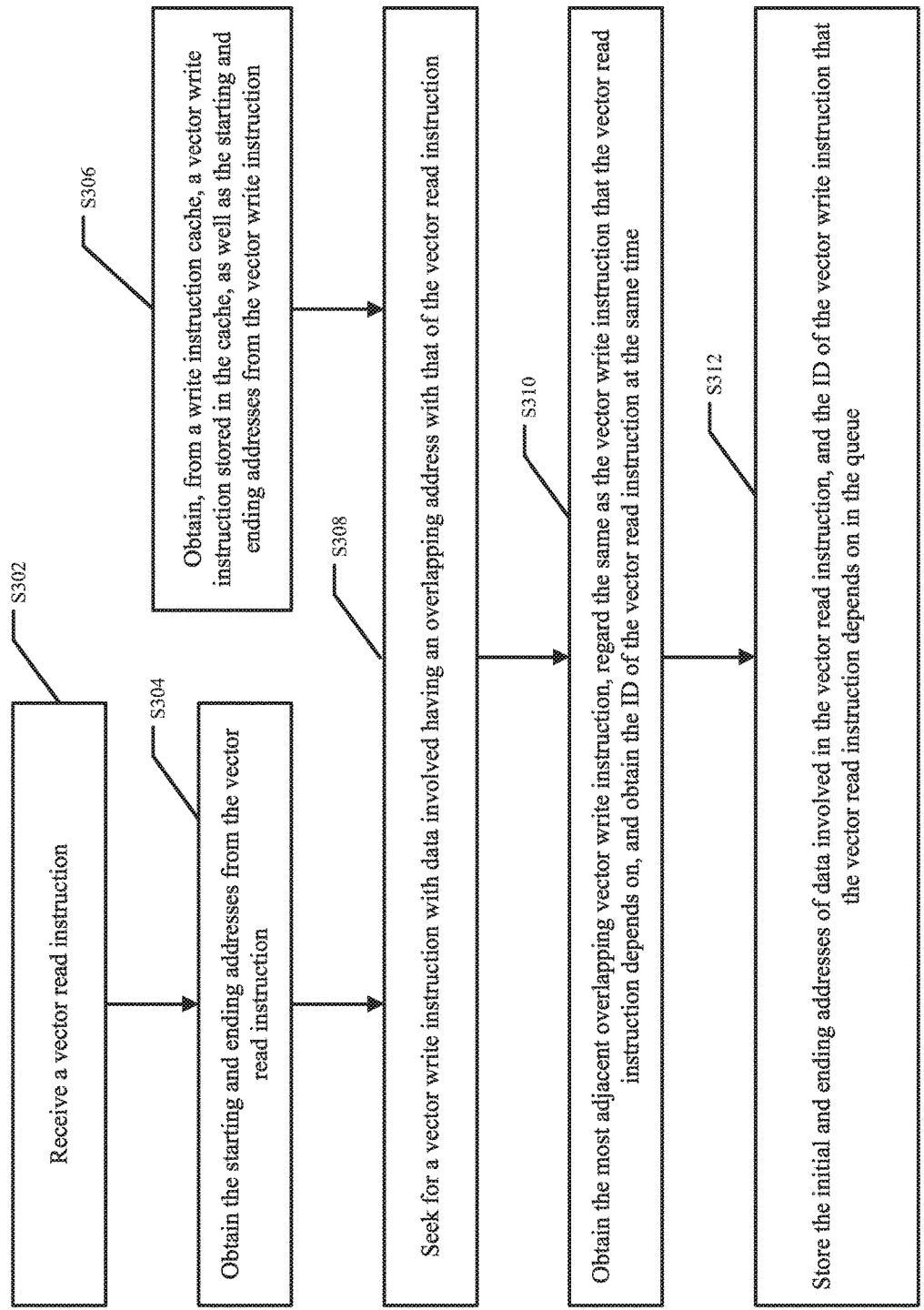
FIG. 3 is a flowchart of preprocessing a vector read instruction by a read instruction preprocessing unit in the data read-write scheduler as shown in FIG. 2.

FIG. 3 is a flowchart of preprocessing a vector read instruction by the read instruction preprocessing unit 321 in the data read-write scheduler 300 as shown in FIG. 2. With reference to FIG. 3, the process of preprocessing a vector read instruction by the read instruction preprocessing unit 321 comprises:

Step S302: the read instruction preprocessing unit 321 may be configured to receive a vector read instruction from the instruction cache 310.

Step S304: the read instruction preprocessing unit 321 may be configured to obtain a first pair of starting and ending addresses from the vector read instruction. The first pair of starting and ending addresses may identify a target read range in the on-chip RAM 200. The target read range may further identify a portion of data to be read by the read control module 360.

Step S306: the read instruction preprocessing unit 321 may be configured to obtain, from the write instruction cache, the vector write instructions stored in the cache, as well as a second pair of starting and ending addresses from each of the vector write instructions. Each second pair of starting and ending addresses may identify a target write range in the on-chip RAM 200 for storing content data.

Step S308: the read instruction preprocessing unit 321 may be configured to compare the starting and ending addresses in the vector read instruction, one by one with those in the vector write instructions stored in the write instruction cache to pick out those overlapping or conflicting vector write instructions. In other words, the read instruction preprocessing unit 321 may be configured to respectively compare the target read range with each one of the target write ranges to identify the overlapping or conflicting vector write instructions. If none of the target write ranges overlaps with the target read range, the following steps S310 and S312 may be omitted.

Step S310: the read instruction preprocessing unit 321 may be configured to select a nearest vector write instruction from the overlapping vector write instructions and obtain the ID of the nearest vector write instruction. As described above, the nearest vector write instruction may refer to the vector write instruction that is stored nearest to the vector read instruction in an instruction queue. The nearest vector write instruction may also be referred to as the dependent vector write instruction.

Step S312: the read instruction preprocessing unit 321 may be configured to store the vector read instruction, the first pair of the starting and ending addresses in the vector read instruction, and the ID of the dependent vector write instruction, in the queue of the read instruction cache module 340.

The read control module 360 includes a plurality of read control units 361 configured to receive the vector read instructions transmitted by the read instruction cache module 340, parse read requests, determine the timing for executing the read requests according to the status of the dependent vector write instruction, the status being obtained from the write control module 370; when the timing is satisfied, send the read requests to the on-chip RAM 200, then receive the input data from the on-chip RAM 200, and store the input data in the read data cache module 380, the stored input data being accessible by an external operations component.

Figure 4:
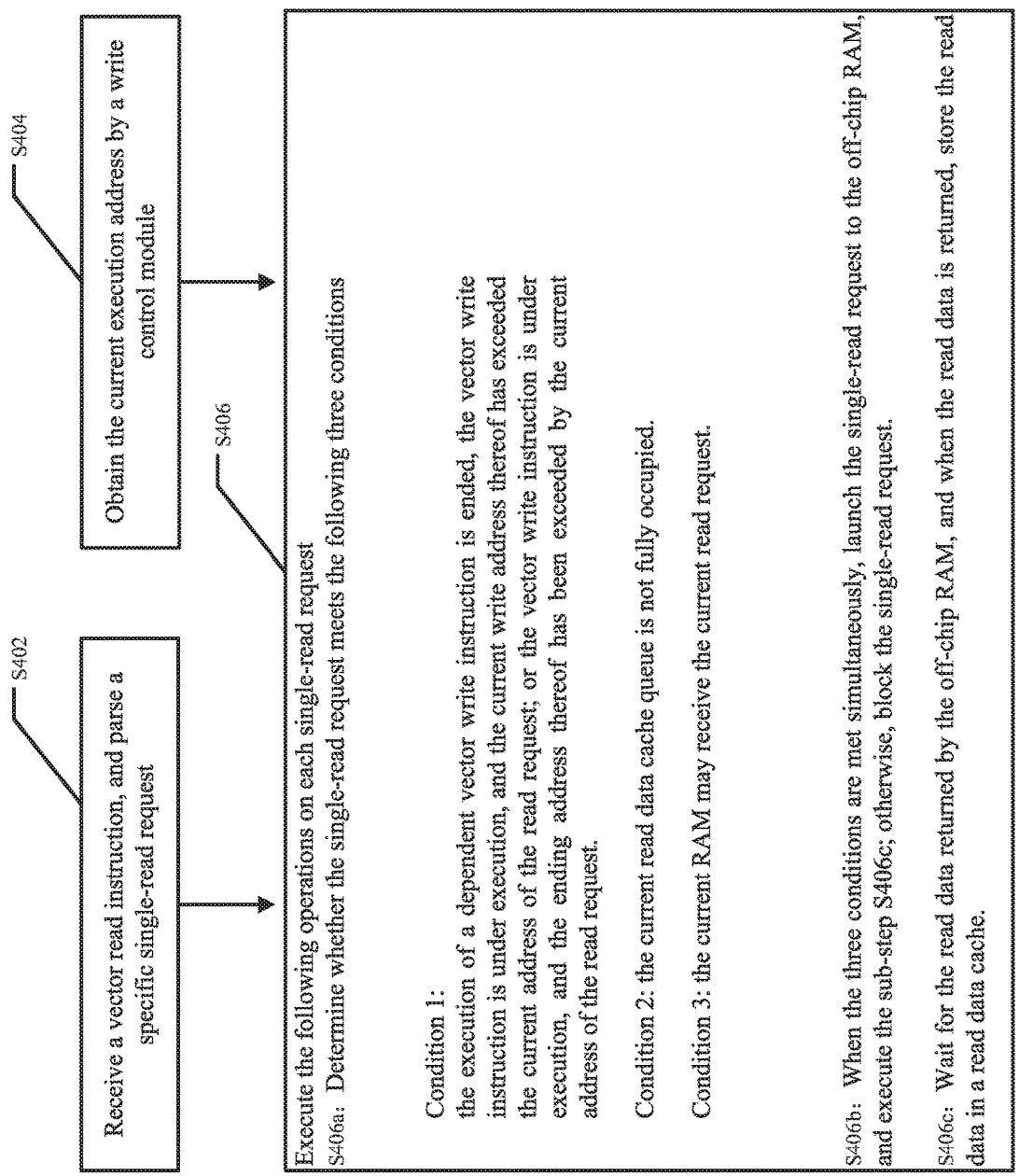
FIG. 4 is a flowchart of making a data request by the read control unit in the data read-write scheduler as shown in FIG. 2.

FIG. 4 is a flowchart of making a data request by the read control unit 361 in the data read-write scheduler as shown in FIG. 2. With reference to FIG. 4, the process for making data requests by the read control unit comprises:

Step S402: the read control unit 361 may be configured to extract the read requests from the vector read instruction.

Step S404: the read control unit 361 may be configured to obtain a current write address of a write request of the dependent vector write instruction that is currently being executed from the write control module.

Step S406: the read control unit 361 may be configured to obtain perform the following operations for each read request;

Sub-step S406a: the read control unit 361 may be configured to obtain determine whether the read request meets the following three conditions:
        (1) the status of the dependent vector write instruction indicates that the dependent vector write instruction is executed (e.g., "execution ended"), or the status indicates that the dependent vector write instruction is being executed (e.g., "under execution") and the current write address has exceeded the ending address of the target read range, or the status indicates that the dependent vector write instruction is being executed and the ending address of the target write range has been exceeded by the current read address of the current read request;
        (2) the data queue of the current read control unit is not full;
        (3) the current on-chip RAM is able to receive the read requests;
    Sub step S406b: when the above three conditions are met, the read control unit 361 may be configured to transmit the read request to the on-chip RAM 200, and to perform the sub-step S406c; otherwise, the read control unit 361 may be configured to block the read request;
    Sub-step S406c: after the read data is received, the read control unit 361 may be configured to store the read data in the read data cache module 380.

In at least some examples, if the status of the dependent vector write instruction indicates that the dependent vector write instruction is executed, no write-after-read conflict will occur between the vector read instruction and the dependent vector write instruction. In this case, if a data queue of the read control unit is not full and the on-chip RAM 200 is able to receive the read request, the read control unit 361 may be configure to execute the read request. If the data queue of the read control unit is full or the on-chip RAM is unable to receive the read request, the read control unit 361 may be configure to block the read request. In some other examples, if the status of the dependent vector write instruction indicates that the dependent vector write instruction is being executed, the read control unit 361 may be configure to determine whether the write-after-read conflict exists. For example, the read control unit 361 may be configured to determine if a current write address of a current write request of the dependent vector write instruction has exceeded the ending address of the target read range of the vector read instruction. That is, if the current write address has exceeded the ending address of the target read range, a data queue of the read control unit is not full, and the on-chip RAM is able to receive the read request, the read control unit 361 may be configure to execute the read request.

In yet some other examples, the read control unit 361 may be configure to determine if the ending address of the target write range of the dependent vector write instruction has been exceeded by a current read address of a current read request. That is, if the ending address of the target write range has been exceeded by the current read address of the current read request, a data queue of the read control unit is not full, and the on-chip RAM is able to receive the read request, the read control unit 361 may be configure to execute the read request.

In some example, the read data cache module 380 may include one or more read data cache configured to store data received from read control unit 361 and transmit the received data to vector operations component 500.

The read instruction cache module 340 comprises a plurality of read instruction cache units 341 for receiving and caching vector read instructions obtained from the plurality of read instruction preprocessing units 321, and dynamically updating the status of the vector read instructions cached therein according to the execution status of the current vector read instruction and the dependent vector write instruction.

The operations for the status update of the vector read instruction performed by the read instruction cache module 340 may include the following five circumstances:

(1) when a new vector read instruction enters the queue of read instruction cache unit 341, the status of the vector read instruction may be updated to indicate that the vector read instruction is to be launched (e.g., "to be launched");

(2) when the dependent vector write instruction is being executed or its execution has concluded, the status of the vector read instruction is updated to indicate that the vector read instruction is transmittable (e.g., "launchable");

(3) the read instruction cache units may be configured to transmit the vector read instruction and update the status of the vector read instruction to indicate that the vector read instruction is being executed (e.g., "under execution") based on a determination that a previous status of the vector read instruction indicates that the vector read instruction is transmittable, and that an immediately preceding vector read instruction has been transmitted;

(4) the read instruction cache units may be configured to update the status of the vector read instruction to indicate that the vector read instruction has been transmitted (e.g., "launched") after all of the read requests of the vector read instruction have been transmitted by the read instruction cache unit;

(5) the read instruction cache units may be configured to update the status of the vector read instruction to indicated that the vector read instruction is executed (e.g., "execution ended") based on a determination that the read requests of the vector read instruction have been processed by the on-chip RAM 200 and that results of the read requests have been received from the on-chip RAM 200.

The data read operation is completed by the combined operations of the above read instruction cache unit, read control unit and read data cache, and the read-after-write conflict is avoided.

The data write scheduler 392 may be described in greater detail below. The data write scheduler 392 may include a write instruction preprocessing unit 330 and a write control module 370.

The write instruction preprocessing unit 330 may be configured to receive the vector write instructions input from the instruction cache 310 and detect write-after-read conflicts between that vector write instruction and one or more vector read instructions stored in the read instruction cache module 340; if the current vector write instruction and the vector read instructions are overlapping in address range, the nearest overlapping vector read instruction is selected as the vector read instruction that the vector write instruction depends on (interchangeably referred to as dependent vector read instruction), and the ID of the vector read instruction, together with the vector write instruction, may be stored in the queue of the write instruction cache module. In at least some example, the nearest overlapping vector read instruction may refer to an overlapping vector read instruction that is stored nearest to the vector write instruction in an instruction queue.

Figure 5:
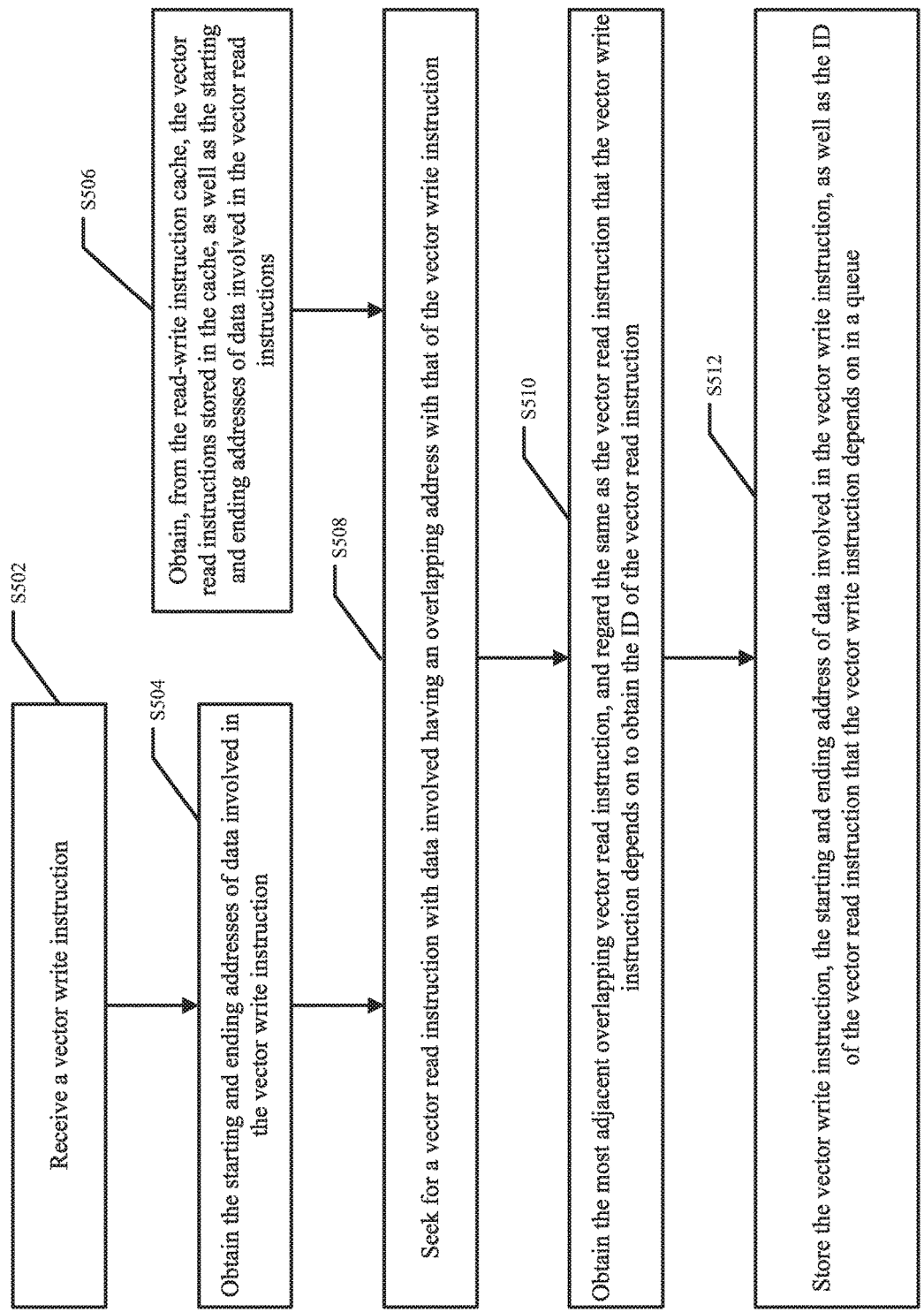
FIG. 5 is a flowchart of preprocessing a vector write instruction by a write instruction preprocessing unit in the data read-write scheduler as shown in FIG. 2.

FIG. 5 is a flowchart of preprocessing a vector write instruction by the write instruction preprocessing unit 330 in the data read-write scheduler 300 as shown in FIG. 2. With reference to FIG. 5, the process of preprocessing the vector write instructions by the write instruction preprocessing unit 330 comprises:

Step S502: the write instruction preprocessing unit 330 may be configured to receive a vector write instruction from the instruction cache 310.

Step S504: the write instruction preprocessing unit 330 may be configured to obtain a first pair of starting and ending addresses from the vector write instruction. The first pair of starting and ending addresses may identify a target write range in the on-chip RAM 200. The target write range may identify an address range to store the content data.

Step S506: the write instruction preprocessing unit 330 may be configured to obtain, from the read instruction cache, the vector read instructions stored therein, as well as a second pair of starting and ending addresses from each of the vector read instructions. Each second pair of starting and ending addresses may identify a portion of data to be ready by the read control module 360.

Step S508: the write instruction preprocessing unit 330 may be configured to compare the starting and ending addresses in the vector write instruction, one by one with those in the vector read instructions stored in the read instruction cache to identify the overlapping vector read instructions. In other words, the write instruction preprocessing unit 330 may be configured to respectively compare the target write range with each one of the target read ranges to identify the overlapping or conflicting vector read instructions. If none of the target read range overlaps with the target write range, the following steps S510 and S512 may be omitted.

Step S510: the write instruction preprocessing unit 330 may be configured to select a nearest vector read instruction from the overlapping vector read instructions as the dependent vector read instruction, and obtain the ID of that vector read instruction;

Step S512: the write instruction preprocessing unit 330 may be configured to store the first pair of starting and ending addresses in that vector write instruction, and the ID of the dependent vector read, in the queue of the write instruction cache module 350.

The write instruction cache module 350 may be configured to receive the vector write instructions obtained from the write instruction preprocessing unit 330, and dynamically update the status of the vector write instructions stored therein according to the execution status of the read control module 360 and the write control module 370, and transmit the vector write instructions that comply with the requirements.

The operations for the status update of the vector write instruction performed by the write instruction cache module 350 may include the following five circumstances:

(1) the write instruction cache module 350 may be configured to update the status of the vector write instruction to indicate that the vector write instruction is to be transmitted (e.g., "to be launched") based on a determination that a new vector write instruction enters a queue of the write instruction cache unit;

(2) the write instruction cache module 350 may be configured to update the status of the vector write instruction to indicate that the vector write instruction is transmittable (e.g., "launchable") based on a determination that the dependent vector read instruction is being executed or has been executed;

(3) the write instruction cache module 350 may be configured to transmit the vector write instruction and update the status of the vector write instruction to indicate that the vector write instruction is being executed (e.g., "under execution") based on a determination that an immediately preceding vector write instruction has been transmitted, and that a previous status of the vector write instruction indicates that the vector write instruction is transmittable;

(4) the write instruction cache module 350 may be configured to update the status of the vector write instruction to indicate that the vector write instruction is transmitted (e.g., "launched") after the write requests of the vector write instruction have been transmitted by the write control module;

(5) the write instruction cache module 350 may be configured to update the status of the vector write instruction to indicate that the vector write instruction is executed (e.g., "execution ended") based on a determination that all of the write requests of the vector write instruction have been processed by the on-chip RAM 200, and that the feedback is received from the on-chip RAM 200

The write control module 370 may be configured to receive the vector write instructions launched by the write instruction cache module 350, parse therefrom specific write requests, receive the content data from the content data cache 390, and determine the timing for executing the write requests according to the status of the dependent vector read instruction, the status being obtained from the read control module 360, and when the timing is satisfied, send the write requests and the content data to the on-chip RAM 200, and then receive the feedback of the write result from the on-chip RAM 200.

The content data cache 390 may be configured to cache data that need to be written (e.g., the content data), from the vector operations component 500, and send the content data to the write control module 370.

Figure 6:
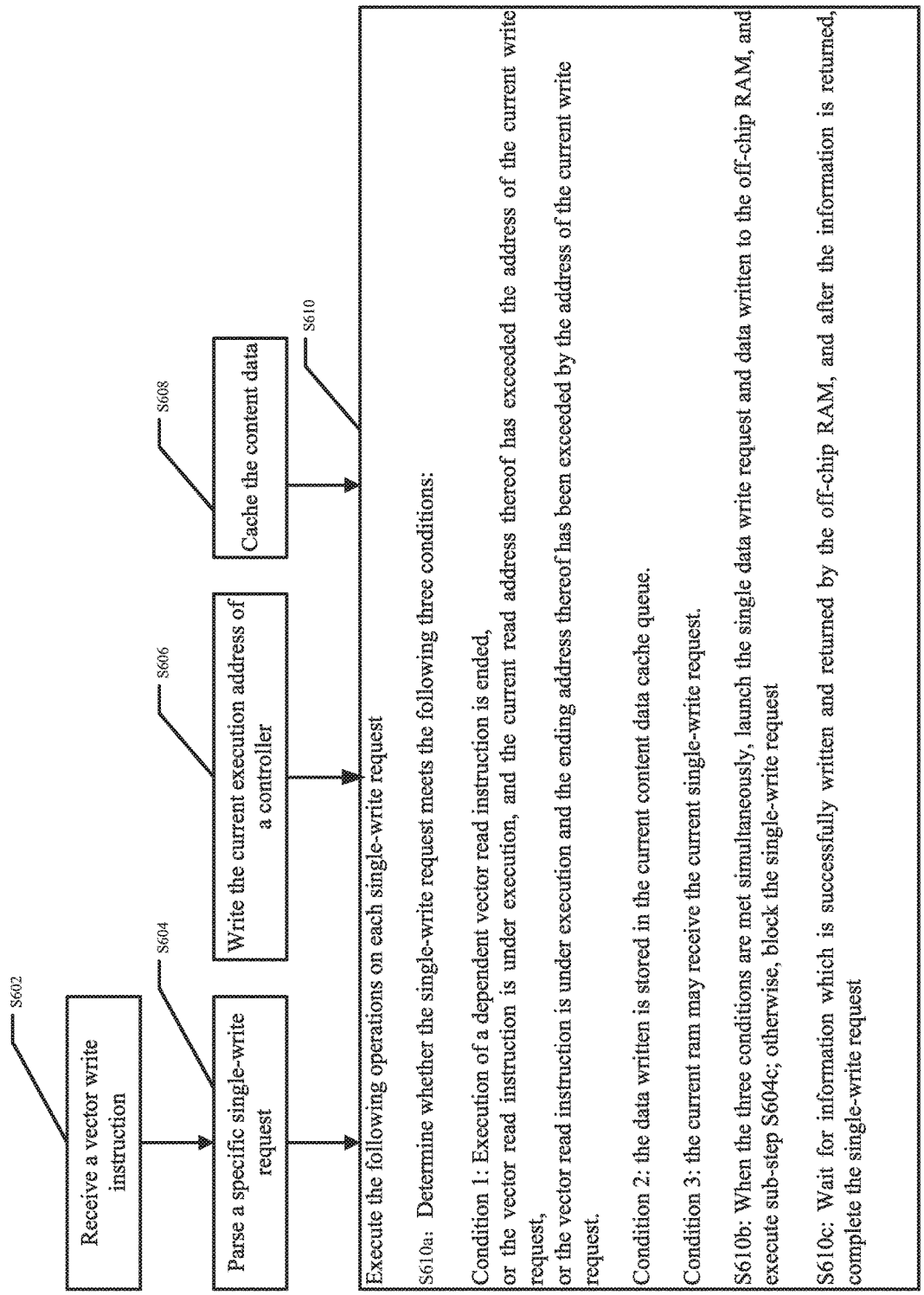
FIG. 6 is a flowchart of writing data by the write control module in the data read-write scheduler as shown in FIG. 2.

FIG. 6 is a flowchart of writing data by a write control module 370 in the data read-write scheduler 300 as shown in FIG. 2. With reference to FIG. 6, the process of writing data by the write control module comprises:

Step S602: the write control module 370 may be configured to receive a vector write instruction.

Step S604: the write control module 370 may be configured to extract one or more write requests from the vector write instruction.

Step S606: the write control module 370 may be configured to obtain a current read address of a current read request of the dependent vector read instruction;

Step S608: the write control module 370 may be configured to write the content data into the content data cache 390. In at least one example, content data cache 390 may be configured to receive the content data from the vector operations component 500 and transmit the content data to write control module 370.

Step S610: the write control module 370 may be configured to perform the following operations for each write request:

Sub-step S610a: the write control module 370 may be configured to determine whether the write request meets the following three conditions:

(1) the status of the vector read instruction that the vector write instruction depends on is "execution ended", or the status thereof is "under execution" and the current read address of the current read request has exceeded the ending address of the target write range, or the status thereof is "under execution" and the ending address of the target read range has been exceeded by the current write address of the current write request;

(2) the current data queue of the write control module includes data to be written;

(3) the on-chip RAM 200 can receive the current write request;

Sub step S610b: when the above three conditions are met, the write control module 370 may be configured to launch the write request, write data to the on-chip RAM 200, and perform sub-step S604c; otherwise, the write control module 370 may be configured to block the write request;

Sub-step S610c: after the message that the writing is successful returns from the on-chip RAM 200, the write control module 370 may conclude the write request.

In at least some examples, if the status of the dependent vector read instruction indicates that the dependent vector read instruction is executed, no write-after-read conflict will occur between the vector write instruction and the dependent vector read instruction. In this case, if a data queue of the read control unit is not full and the on-chip RAM 200 is able to receive the write request, the write control module 370 may be configure to execute the write request. If the data queue of the write control module 370 is full or the on-chip RAM 200 is unable to receive the write request, the write control module 370 may be configure to block the write request.

In some other examples, if the status of the dependent vector read instruction indicates that the dependent vector read instruction is being executed, the write control module 370 may be configure to determine whether the write-after-read conflict exists. For example, the write control module 370 may be configure to determine if a current read address of a current read request of the dependent vector read instruction has exceeded the ending address of the target write range of the vector write instruction. That is, if the current read address has exceeded the ending address of the target write range, a data queue of the read control unit is not full, and the on-chip RAM is able to receive the read request, the write control module 370 may be configure to execute the write request.

In yet some other examples, the write control module 370 may be configure to determine if the ending address of the target read range of the dependent vector read instruction has been exceeded by a current write address of a current write request. That is, if the ending address of the target read range has been exceeded by the current write address of the current write request, a data queue of the read control unit is not full, and the on-chip RAM is able to receive the read request, the read control unit 361 may be configure to execute the read request.

The data write operation is completed by the combined operations by the above write instruction cache module 350, the write control module 370 and the content data cache 390, and the write-after-read conflict is avoided.

The on-chip RAM 200 stores operation data and operation results and may process a plurality of vector read requests and vector write requests simultaneously because of the partition according to the lowest address.

FIG. 7A and FIG. 7B FIG. 7A and FIG. 7B are diagrams illustrating the relation between a target write range of a vector write instruction and a target read range of a vector read instruction.

Referring to FIG. 7A, with respect to each read request, the read control unit 361 may be configured to determine that the ending address 704 of the target write range 710 of the dependent vector write instruction has been exceeded by a current read address 718 of a current read request. In this case, when a data queue of the read control unit is not full, and the on-chip RAM is able to receive the read request, the read control unit 361 may be configure to execute the read request.

Alternatively, with respect to each write request, the write control module 370 may be configure to determine if a current read address 718 of a current read request of the dependent vector read instruction has exceeded the ending address 704 of the target write range 710 of the vector write instruction. In this case, when a data queue of the read control unit is not full, and the on-chip RAM is able to receive the read request, the write control module 370 may be configure to execute the write request.

Referring to FIG. 7B, with respect to each reach request, the read control unit 361 may be configured to determine if a current write address 744 of a current write request of the dependent vector write instruction has exceeded the ending address 724 of the target read range 730 of the vector read instruction. In this case, when a data queue of the read control unit is not full, and the on-chip RAM is able to receive the read request, the read control unit 361 may be configure to execute the read request.

Alternatively, with respect to each read request, the write control module 370 may be configure to determine if the ending address 724 of the target read range 730 of the dependent vector read instruction has been exceeded by a current write address 744 of a current write request. In this case, when a data queue of the read control unit is not full, and the on-chip RAM is able to receive the read request, the write control module 370 may be configure to execute the write request. The reservation station in the embodiment may continuously and stably launch data to the vector operations component, receiving the computation result from the vector operations component, and then writing into the RAM in turn. As compared with conventional reservation stations, the reservation station in the embodiment may more quickly perform data read-write operations required by the vector operations.

So far, the introduction of the reservation station for vector operations in the subject embodiment is finished.

Another embodiment of the subject disclosure further provides a data read scheduler for vector operations. The data read scheduler implements some of functions of the data read-write scheduler in the above embodiment, and both of them have the same structure. For this reason, more details will not be provided here.

Another embodiment in the subject disclosure further provides a data write scheduler for vector operations. The data write scheduler implements some of functions of the data read-write scheduler in the above embodiment, and both of them have the same structure. For this reason, more details will not be provided here.

Another embodiment in the subject disclosure further provides a data read-write scheduler for vector operations. The data read-write scheduler implements functions of the data read-write scheduler in the above embodiment, and both of them have the same structure. For this reason, more details will not be provided here.

So far, a plurality of embodiments of the subject disclosure have been described in detail in combination with the drawings. Based on the above description, a person skilled in the art should have a clear understanding of the data read scheduler, the data write scheduler, the data read-write scheduler and the reservation station for vector operations in the subject disclosure.

It should be noted that the implementation modes that are not indicated or described in the drawings or the text of the specification are forms known to a person ordinarily skilled in the relevant technical field, and thus no more details are given. In addition, the above definitions to components and methods are not limited to various specific structures, shapes or modes mentioned in the embodiments, and a person ordinarily skilled in the art could make simple changes or replacements thereof, for example:

(1) the on-chip RAM can also have direct access to the off-chip data in the form of off-chip memory access;

(2) the decoder may be replaced by a vector instruction cache queue;

(3) unless steps are particularly described or must occur in order, the order of the above steps is not limited to what is listed above and may be changed or re-arranged in light of needs.

To sum up, the subject disclosure can process the inter-dependency between vector read-write instructions, i.e. the write-after-read conflict and read-after-write conflict, by providing the read instruction cache module and the write instruction cache module and detecting conflict instructions based on the two modules. Meanwhile, the subject disclosure can more quickly perform data read-write operations required for vector operations as compared with conventional reservation stations and guarantee the correctness of data read and written in the condition where there are write-after-read and read-after-write conflicts, and thus has more values for promotion and application.

The algorithm and display provided here are not inherently related to any specific computers, virtual systems or other devices. Various general-purpose systems can also be used on the basis of the teachings here. According to the above description, the structure required for constructing such a system is obvious. Besides, the subject disclosure is also not directed to any specific programming language. It shall be understood that various programming languages can be used for realizing the contents of the subject disclosure as described here, and the above description of a specific language aims to disclose an optimal embodiment of the subject disclosure.

A great number of specific details are given in the specification provided here. However, it can be understood that the embodiments in the subject disclosure can be realized without those specific details. In some embodiments, common methods, structures and technologies are not indicated to avoid an ambiguous understanding of the subject specification.

Similarly, it shall be understood that in order to simplify the disclosure and help to understand one or more of aspects in the subject disclosure, in the above description of the exemplary embodiments in the subject disclosure, various features in the subject disclosure sometimes are grouped into individual embodiments and figures or description thereof. However, the methods disclosed shall not be interpreted to reflect the following intentions: the claims sought to be protected in the subject disclosure have more features than those explicitly defined in each claim. More exactly, just as reflected in the following claims, an inventive aspect lies in having features fewer than all features in each single embodiment disclosed in the preceding text. Therefore, the claims following specific embodiments are explicitly hereby incorporated into the specific embodiments, wherein each claim per se serves as an independent embodiment in the subject disclosure.

Persons skilled in the art could understand that self-adaptive changes may be made to modules in the devices of the embodiments, and the modules can be provided in one or more devices different from that in the embodiments. The modules or units or components in the embodiments may be combined to a module or unit or component and may be divided into a plurality of sub-modules or subunits or sub-components. Unless at least some of such features and/or processes or units go against each other, any combination thereof may be used for combining all features disclosed in the subject specification (including the accompanying claims, abstract and drawings) and any method or all processes of devices or units in such disclosure. Unless otherwise explicitly stated, each feature disclosed in the subject specification (including the accompanying claims, abstract and drawings) may be replaced by alternative features providing identical, equivalent or similar objects.

In addition, a person skilled in the art could understand that although some embodiments stated here comprise some features included in other embodiments, not other features, combinations of features in different embodiments mean falling under the scope of the subject disclosure and can form different embodiments. For example, in the following claims, any of embodiments sought to be protected may be used in any combination.

Embodiments of components in the subject disclosure may be realized with hardware or may be realized with software modules operated on one or more processors or realized in combination of hardware and one or more processors. A person skilled in the art shall understand that some or all functions of some or all components in related devices in the embodiments of the subject disclosure may be realized by using a microprocessor or a digital signal processor (DSP). The subject disclosure may further execute programs (e.g. computer programs and computer program products) of some or all devices or apparatuses for executing the method described here. In this way, the programs executed in the subject disclosure may be stored on a computer readable medium or may be in the form of one or more signals. Such signals may be downloaded from an internet network, or provided on a carrier signal, or provided in any other form.

It shall be noticed that the above embodiments explain the subject disclosure, not limit the subject disclosure. Moreover, a person skilled in the art could design alternative embodiments without departing from the scope thereof. In the claims, any reference signs located between brackets shall not constitute limitation on the claims. The words "comprise" and "include" do not exclude any component or step not listed in the claims. The word "a" before the "component" does not exclude a plurality of such components. The subject disclosure may be realized by hardware comprising several different components and by properly programmed computer. In the claims enumerating units of several apparatuses, some of those apparatuses may be particularly reflected by the same hardware. The use of the word "the first", "the second", "the third" and so forth does not represent any order. Those words may be interpreted as names.

The above specific embodiments further explain the object, technical solution and beneficial effects of the subject disclosure in detail. It shall be understood that what are stated above are merely the specific embodiments of the subject disclosure, not for limiting the subject disclosure. According to the spirit and principle of the subject disclosure, any modifications, equivalent replacements, improvements, and so forth made shall fall under the scope of protection of the subject disclosure.

We claim:

1. A data write scheduler for vector operations, comprising:
 a write instruction preprocessing unit configured to
  receive a vector write instruction,
  detect at least one read-after-write conflict between the vector write instruction and one or more vector read instructions stored in a data read scheduler, and
  identify one of the vector read instructions that results the read-after-write conflict as a dependent vector read instruction that corresponds to the vector write instruction; and
 a write control module configured to
  extract one or more write requests from the received vector write instruction,
  sequentially submit the one or more write requests and content data to an on-chip RAM based on an execution status of the dependent vector read instruction, a target write range in the on-chip RAM, and a target read range in the on-chip RAM, and
  receive feedback from the on-chip RAM regarding the write requests, wherein the write instruction preprocessing unit is further configured to:
  obtain a first pair of starting and ending addresses from the vector write instruction,
   wherein the first pair of starting and ending addresses identify the target write range in the on-chip RAM, and
   wherein each of the one or more write request is configured to write a portion of the content data to a write address within the target write range,
  obtain a second pair of starting and ending addresses from each of the vector read instructions in the data read scheduler,
   wherein each of the second pairs of starting and ending addresses identify the target read range in the on-chip RAM, and
   wherein each of the vector read instructions includes one or more read requests respectively configured to read data from a read address within the target read range,
  compare the target write range with each of the target read ranges, and
  detect the read-after-write conflict based on a determination that the target write range overlaps at least one of the one or more target read ranges.

2. The data write scheduler of claim 1, wherein the write instruction preprocessing unit is further configured to:
 select one from the one or more of the vector read instructions that overlap with the vector write instruction as the dependent vector read instruction, wherein the dependent vector read instruction is nearest to the vector write instruction in an instruction queue,
 obtain an identification of the dependent vector read, and
 cache the vector write instruction, the first pair of the starting and ending addresses in the vector write instruction, and the identification of the dependent vector read instruction.

3. The data write scheduler of claim 1, wherein the write control module is further configured to:
 execute one of the write requests based on a determination
  that the execution status indicates that the dependent vector read instruction is executed,
  that a data queue of the write control module includes data to be written, and
  that the on-chip RAM is able to receive the one of the write requests.

4. The data write scheduler of claim 1, wherein the write control module is further configured to:
 execute one of the write requests based on a determination
  that a current read address of a current read request of the dependent vector read instruction has exceeded the ending address of the target write range,
  that a data queue of the write control module includes data to be written, and
  that the on-chip RAM is able to receive the one of the write requests.

5. The data write scheduler of claim 1, wherein the write control module is further configured to:
 execute one of the write requests based on a determination
  that the ending address of the target read range of the dependent vector read instruction has been exceeded a current write address of a current write request the target write range,
  that a data queue of the write control module includes data to be written, and
  that the on-chip RAM is able to receive the one of the write requests.

6. The data write scheduler of claim 1, further comprising a written data cache configured to receive and cache the content data and to transmit the content data to the write control module.

7. The data write scheduler of claim 1, further comprising:
 an instruction cache configured to receive and cache the vector write instruction;
 a write instruction cache unit that interfaces with the write instruction preprocessing unit and the write control module, wherein the write instruction cache unit is configured to
  receive and cache the vector write instruction processed by the write instruction preprocessing unit and the identification of the dependent vector read instruction, and
  dynamically update status of the vector write instruction cached in the write instruction cache unit and transmit the vector write instruction according to the execution status of the dependent vector read instruction obtained from the data read scheduler and an execution status of the vector write instruction obtained from the write control module.

8. The data write scheduler of claim 7, wherein the write instruction cache unit is further configured to:
 update the status of the vector write instruction to indicate that the vector write instruction is to be transmitted based on a determination that a new vector write instruction enters a queue of the write instruction cache unit, update the status of the vector write instruction to indicate that the vector write instruction is transmittable based on a determination that the dependent vector read instruction is being executed or has been executed, transmit the vector write instruction and update the status of the vector write instruction to indicate that the vector write instruction is being executed based on a determination that an immediately preceding vector write instruction has been transmitted, and that a previous status of the vector write instruction indicates that the vector write instruction is transmittable, update the status of the vector write instruction to indicate that the vector write instruction is transmitted after the write requests of the vector write instruction have been transmitted by the write control module, and update the status of the vector write instruction to indicate that the vector write instruction is executed based on a determination that all of the write requests of the vector write instruction have been processed by the on-chip RAM, and that the feedback is received from the on-chip RAM.

9. A method for vector operations, comprising:

receiving, by a write instruction preprocessing unit, a vector write instruction;

detecting, by the write instruction preprocessing unit, at least one read-after-write conflict between the vector write instruction and one or more vector read instructions stored in a data read scheduler;

identifying, by the write instruction preprocessing unit, one of the vector read instructions that results the read-after-write conflict as a dependent vector read instruction that corresponds to the vector write instruction;

extracting, by a write control module, one or more write requests from the received vector write instruction;

sequentially submitting, by the write control module, the one or more write requests and content data to an on-chip RAM based on an execution status of the dependent vector read instruction, a target write range in the on-chip RAM, and a target read range in the on-chip RAM;

receiving, by the write control module, feedback from the on-chip RAM regarding the write requests;

obtaining, by the write instruction preprocessing unit, a first pair of starting and ending addresses from the vector write instruction, wherein the first pair of starting and ending addresses identify the target write range in the on-chip RAM, and wherein each of the one or more write request is configured to write a portion of the content data to a write address within the target write range, obtaining, by the write instruction preprocessing unit, a second pair of starting and ending addresses from each of the vector read instructions in the data read scheduler, wherein each of the second pairs of starting and ending addresses identify the target read range in the on-chip RAM, and wherein each of the vector read instructions includes one or more read requests respectively configured to read data from a read address within the target read range, comparing, by the write instruction preprocessing unit, the target write range with each of the target read ranges, and detecting, by the write instruction preprocessing unit, the read-after-write conflict based on a determination that the target write range overlaps at least one of the one or more target read ranges.

10. The method of claim 9, further comprising:

selecting, by the write instruction preprocessing unit, one from the one or more of the vector read instructions that overlap with the vector write instruction as the dependent vector read instruction, wherein the dependent vector read instruction is nearest to the vector write instruction in an instruction queue, obtaining, by the write instruction preprocessing unit, an identification of the dependent vector read, and caching, by the write instruction preprocessing unit, the vector write instruction, the first pair of the starting and ending addresses in the vector write instruction, and the identification of the dependent vector read instruction.

11. The method of claim 9, further comprising:

executing, by the write control module, one of the write requests based on a determination that the execution status indicates that the dependent vector read instruction is executed, that a data queue of the write control module includes data to be written, and that the on-chip RAM is able to receive the one of the write requests.

12. The method of claim 9, further comprising:

executing, by the write control module, one of the write requests based on a determination that a current read address of a current read request of the dependent vector read instruction has exceeded the ending address of the target write range, that a data queue of the write control module includes data to be written, and that the on-chip RAM is able to receive the one of the write requests.

13. The method of claim 9, further comprising:

executing, by the write control module, one of the write requests based on a determination that the ending address of the target read range of the dependent vector read instruction has been exceeded a current write address of a current write request the target write range, that a data queue of the write control module includes data to be written, and that the on-chip RAM is able to receive the one of the write requests.

14. The method of claim 9, further comprising receiving and caching, by a written data cache, the content data and to transmit the content data to the write control module.

15. The method of claim 9, further comprising:

receiving and caching, by an instruction cache, the vector write instruction;

receiving and caching, by a write instruction cache unit that interfaces with the write instruction preprocessing unit and the write control module, the vector write instruction processed by the write instruction preprocessing unit and the identification of the dependent vector read instruction; and dynamically updating, by the write instruction cache unit, status of the vector write instruction cached in the write instruction cache unit and transmit the vector write instruction according to the execution status of the dependent vector read instruction obtained from the data read scheduler and an execution status of the vector write instruction obtained from the write control module.

16. The method of claim 15, further comprising:

updating, by the write instruction cache unit, the status of the vector write instruction to indicate that the vector write instruction is to be transmitted based on a determination that a new vector write instruction enters a queue of the write instruction cache unit, updating, by the write instruction cache unit, the status of the vector write instruction to indicate that the vector write instruction is transmittable based on a determination that the dependent vector read instruction is being executed or has been executed, transmitting, by the write instruction cache unit, the vector write instruction and update the status of the vector write instruction to indicate that the vector write instruction is being executed based on a determination that an immediately preceding vector write instruction has been transmitted, and that a previous status of the vector write instruction indicates that the vector write instruction is transmittable, updating, by the write instruction cache unit, the status of the vector write instruction to indicate that the vector write instruction is transmitted after the write requests of the vector write instruction have been transmitted by the write control module, and updating, by the write instruction cache unit, the status of the vector write instruction to indicate that the vector write instruction is executed based on a determination that all of the write requests of the vector write instruction have been processed by the on-chip RAM, and that the feedback is received from the on-chip RAM.

* * * * *